(12) United States Patent
Willberg et al.

(10) Patent No.: US 7,275,596 B2
(45) Date of Patent: Oct. 2, 2007

(54) METHOD OF USING DEGRADABLE FIBER SYSTEMS FOR STIMULATION

(75) Inventors: Dean M. Willberg, Moscow (RU); Christopher N. Fredd, Missouri City, TX (US); Marina Bulova, Moscow (RU)

(73) Assignee: Schlumberger Technology Corporation, Sugar Lang, TX (US)

( * ) Notice: Subject to any disclaimer, the term of this patent is extended or adjusted under 35 U.S.C. 154(b) by 221 days.

(21) Appl. No.: 11/156,966

(22) Filed: Jun. 20, 2005

(65) Prior Publication Data

US 2006/0283591 A1   Dec. 21, 2006

(51) Int. Cl.
*E21B 43/267* (2006.01)
*E21B 43/04* (2006.01)

(52) U.S. Cl. .............. 166/280.1; 166/278; 166/308.2; 166/308.3; 166/308.5; 166/308.6; 507/202; 507/204; 507/213; 507/216; 507/217; 507/244; 507/248; 507/260; 507/271; 507/273; 507/277

(58) Field of Classification Search ............. 166/278, 166/280.1, 308.2, 308.3, 308.5, 308.6, 309; 507/202, 204, 213, 216, 217, 244, 248, 260, 507/267, 271, 273, 277, 924
See application file for complete search history.

(56) References Cited

U.S. PATENT DOCUMENTS

| | | | |
|---|---|---|---|
| 4,836,940 A | 6/1989 | Alexander | |
| 4,848,467 A | 7/1989 | Cantu et al. | 166/281 |
| 4,957,165 A | 9/1990 | Cantu et al. | 166/295 |
| 4,986,355 A | 1/1991 | Cassad et al. | 166/295 |
| 5,330,005 A | 7/1994 | Card et al. | 166/280 |
| 5,439,055 A | 8/1995 | Card et al. | 166/280 |
| 5,501,275 A | 3/1996 | Card et al. | 166/280 |
| 5,551,514 A | 9/1996 | Nelson et al. | 166/280 |

(Continued)

FOREIGN PATENT DOCUMENTS

WO    0049272    8/2000

(Continued)

OTHER PUBLICATIONS

SPE 91434—*A Mechanical Methodology of Improved Proppant Transport in Low-Viscosity Fluids: Application of a Fiber-Assisted Transport Technique in East Texas* By J.N. Engels, E. Martinez, C.N. Fredd, C.L. Boney and B.A. Holms.

(Continued)

*Primary Examiner*—George Suchfield
(74) *Attorney, Agent, or Firm*—Darla Fonsica; David Cate; Robin Nava

(57) ABSTRACT

A method for minimizing the amount of metal crosslinked viscosifier necessary for treating a wellbore with proppant or gravel is given. The method includes using fibers to aid in transporting, suspending and placing proppant or gravel in viscous carrier fluids otherwise having insufficient viscosity to prevent particulate settling. Fibers are given that have properties optimized for proppant transport but degrade after the treatment into degradation products that do not precipitate in the presence of ions in the water such as calcium and magnesium. Crosslinked polymer carrier fluids are identified that are not damaged by contaminants present in the fibers or by degradation products released by premature degradation of the fibers.

31 Claims, 2 Drawing Sheets

U.S. PATENT DOCUMENTS

| | | | |
|---|---|---|---|
| 5,551,516 A | 9/1996 | Norman et al. | 166/308 |
| 5,667,012 A | 9/1997 | Hoover et al. | 166/308 |
| 5,782,300 A | 7/1998 | James et al. | 166/278 |
| 5,964,295 A | 10/1999 | Brown et al. | 166/308 |
| 5,979,555 A | 11/1999 | Gadberry et al. | 166/270.1 |
| 5,979,557 A | 11/1999 | Card et al. | 166/300 |
| 6,085,844 A | 7/2000 | Palmer et al. | 166/312 |
| 6,140,277 A | 10/2000 | Tibbles et al. | 507/201 |
| 6,169,058 B1 | 1/2001 | Le et al. | |
| 6,172,011 B1 | 1/2001 | Card et al. | 507/204 |
| 6,258,859 B1 | 7/2001 | Dahayanake et al. | 516/77 |
| 6,419,019 B1 | 7/2002 | Palmer et al. | 166/311 |
| 6,509,301 B1 | 1/2003 | Vollmer | 507/236 |
| 6,599,863 B1 | 7/2003 | Palmer et al. | 507/219 |
| 6,691,780 B2 | 2/2004 | Nguyen et al. | |
| 6,837,309 B2 | 1/2005 | Boney et al. | 166/280.2 |
| 6,938,693 B2 | 9/2005 | Boney et al. | 166/280.1 |
| 6,949,491 B2 | 9/2005 | Cooke, Jr. | |
| 7,084,095 B2 * | 8/2006 | Lee et al. | 507/261 |
| 2003/0062160 A1 * | 4/2003 | Boney et al. | 166/278 |
| 2003/0134751 A1 | 7/2003 | Lee et al. | 507/200 |
| 2004/0152601 A1 | 8/2004 | Still et al. | 507/100 |
| 2004/0162356 A1 | 8/2004 | Willberg et al. | 516/21 |
| 2006/0032633 A1 | 2/2006 | Nguyen | 166/280.2 |
| 2006/0157248 A1 * | 7/2006 | Hoefer et al. | 166/300 |

FOREIGN PATENT DOCUMENTS

| | | |
|---|---|---|
| WO | 01/51767 | 7/2001 |

OTHER PUBLICATIONS

SPE 68854—*Field Test of a Novel Low Viscosity Fracturing Fluid in the Lost Hills Field, California*. By S. Vasudevan, D.M Willberg, J.A. Wise, T.L. Gorham, R.C. Dacar, P.F. Sullivan, C.L. Boney, F. Mueller.

* cited by examiner

METHOD OF USING DEGRADABLE FIBER SYSTEMS FOR STIMULATION

BACKGROUND OF THE INVENTION

The invention relates to particulate transport; more particularly it relates to particulate transport in oilfield stimulation treatments; even more particularly it relates to proppant and gravel transport slurried in viscous carrier fluids having insufficient viscosity to prevent particulate settling; even more particularly it relates to the inclusion in such fluids of fibers that aid in transport and inhibit settling; most particularly it relates to such fibers that degrade after the treatment into degradation products that do not precipitate in the presence of ions in the water such as calcium and magnesium, and to the selection of crosslinked polymer carrier fluids that are not damaged by contaminants present in the fibers or degradation products released by premature degradation of the fibers.

Hydrocarbons (oil, condensate, and gas) are typically produced from wells that are drilled into the formations containing them. Often, for a variety of reasons, such as inherently low permeability of the resource-containing formation or damage to the formation caused by drilling and completion of the well, the flow of hydrocarbons into the well and thus to the surface is undesirably low. When that is the case, the well is often "stimulated". One of the most common forms of stimulation is hydraulic fracturing, in which a fluid is injected into the well and then into the formation at a pressure above the "fracture" pressure of the formation. A fracture is formed and grows into the formation, greatly increasing the surface area through which fluids may flow into the well. When the injection pressure is released, the fracture closes; consequently, a particulate material, called a "proppant" is included in the fracturing fluid so that when the pressure is released, the fracture cannot close completely, but rather closes on the proppant and the fracture faces are thus held apart by a bed of proppant through which the fluids may then flow to the well. The fracturing fluid normally must have a minimal viscosity that serves two purposes. First, the more viscous the fluid the more readily the fracture will be widened by injection of more fluid, and, second, a more viscous fluid will more readily transport proppant, hence the term "carrier" fluid. However, when the fluid is viscosified with a polymer, as is often the case, especially with a crosslinked polymer, at least some of the polymer or crosslinked polymer is left in the fracture after the treatment. This viscosifier left in the fracture inhibits the flow of desirable fluids out of the formation, through the fracture, into the wellbore, and to the surface for recovery. To some extent the need for viscosity can be offset by injecting fluid at faster rates, but for a variety of reasons, such as the limitations of the equipment and the costs, this is not always a desirable procedure. The viscosity may also be provided by non-polymeric methods, such as the use of foams, emulsions, and viscoelastic surfactant fluid systems, but sometimes these may not be the solution of choice. Operators may also choose to use the least damaging polymers available, but these may be expensive.

One solution some operators have chosen to minimize cost and polymer damage is to use as little polymer as possible. One such method is slickwater (also called waterfrac) treatments (with minimal proppant and a fluid viscosity, for example, of only about 3 cP, as opposed to conventional jobs with crosslinked polymer carrier fluids that typically have viscosities of at least 100 cP, and usually much more. To make up for the low viscosity, such jobs are usually pumped at high rates to help create the fracture and to transport the proppant, but fracture height growth may be excessive, very little proppant is placed, and the proppant may settle into the bottom of the fracture. This settling can occur as the fluid breaks or simply as a result of inadequate initial designed viscosity. Sometimes operators try to compromise with a combination of hybrid of a slickwater and a conventional job, which may result in the disadvantages of each.

Typically, when operators choose to use a more conventional fracturing method with polymer-based carrier fluids, they try to use the lowest possible polymer concentration, to minimize the damage caused by the polymer. It has recently been found that fibers included in the slurry of proppant in carrier fluid may serve to aid in the transport of proppant at lower viscosities and/or lower slurry flow rates (see SPE 68854 and SPE 91434) provided that fibers of the appropriate length, diameter, and stiffness are chosen and used in the right concentration. Such fibers also have the advantages that they improve the properties of the proppant pack, such as its fluid conductivity, its ability to aid in sand control, and resistance to flowing back of proppant particles into the wellbore. However, although the treatments have been very successful, there is still room for improvement; the materials previously typically used for the fibers either (glass or novoloid) did not degrade under formation conditions or did not have optimized stiffness for proppant transport or (polyethylene terephthalate) degraded into products that could reduce the final effectiveness of the fracture.

SUMMARY OF THE INVENTION

A method of treating a wellbore and a formation penetrated by the wellbore is given in which the method contains the step of injecting a slurry of fibers and proppant in a viscous carrier fluid. The viscosity of the carrier fluid in the absence of fibers is insufficient to prevent proppant settling during transport. The fibers degrade after the treatment into products that do not precipitate in the presence of calcium or magnesium ions. The step of injecting may optionally be carried out above the fracture pressure of the formation, in which case the viscosity of the carrier fluid in the absence of fibers may optionally be insufficient to prevent proppant settling in the fracture before closure of the fracture after injection is stopped.

Suitable fibers are selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, and copolymers of lactic acid with other hydroxy-, carboxylic acid-, or hydroxycarboxylic acid-containing moieties, and mixtures of those materials Typically, the fibers have a length of about 2 to about 25 mm, preferably about 3 to about 18 mm. Typically, the fibers have a denier of about 0.1 to about 20, preferably about 0.15 to about 6. The fibers degrade at formation temperature in a time between about 4 hours and 100 days.

In one embodiment, the carrier fluid contains a borate crosslinked polymer. The polymer may be guar at a concentration of between about 1.92 g/L (about 16 ppt) and about 3.6 g/L (about 30 ppt), preferably between about 1.92 g/L (about 16 ppt) and about 2.88 g/L (about 24 ppt). The carrier fluid may contain a pH control agent present in an amount sufficient to neutralize any acid present in the fibers before the injection and to neutralize any acid generated by the fibers before the fracture closes. The acid is neutralized for example to an extent sufficient to maintain the viscosity of the fluid in the presence of fibers above about 75 cP at a shear rate of 100 sec$^{-1}$ at the temperature of the formation. The pH control agent is selected from amines or alkaline earth, ammonium, and alkali metal salts of sesquicarbonates, carbonates, hydroxides, oxides, bicarbonates, or organic carboxylates, for example the amines triethanolamine or tetraethylenepentamine. The borate crosslinker is boric acid or sodium tetraborate decahydrate. The fluid optionally also contains a crosslinking delay agent, for example sorbitol.

In another embodiment, the carrier fluid contains a polymer, for example carboxymethylhydroxypropyl guar, crosslinked with a zirconate. The polymer concentration is between about 2.64 g/L (about 22 ppt) to about 3.6 g/L (about 30 ppt). The zirconate crosslinker is for example zirconium lactate. The fluid optionally contains a gel stabilizer, for example sodium thiosulfate.

In yet another embodiment, the fluid may contain a breaker.

In yet further embodiments, the carrier fluid may be thickened with a viscoelastic surfactant, for example a zwitterionic surfactant, for example a betaine, or an amidoamine oxide. In yet further embodiments, the carrier fluid may be an emulsion, may be foamed or energized, or may be a solution of diutan, xanthan, scleroglucan, or hydroxyethylcellulose.

DETAILED DESCRIPTION OF THE INVENTION

Figure 1:
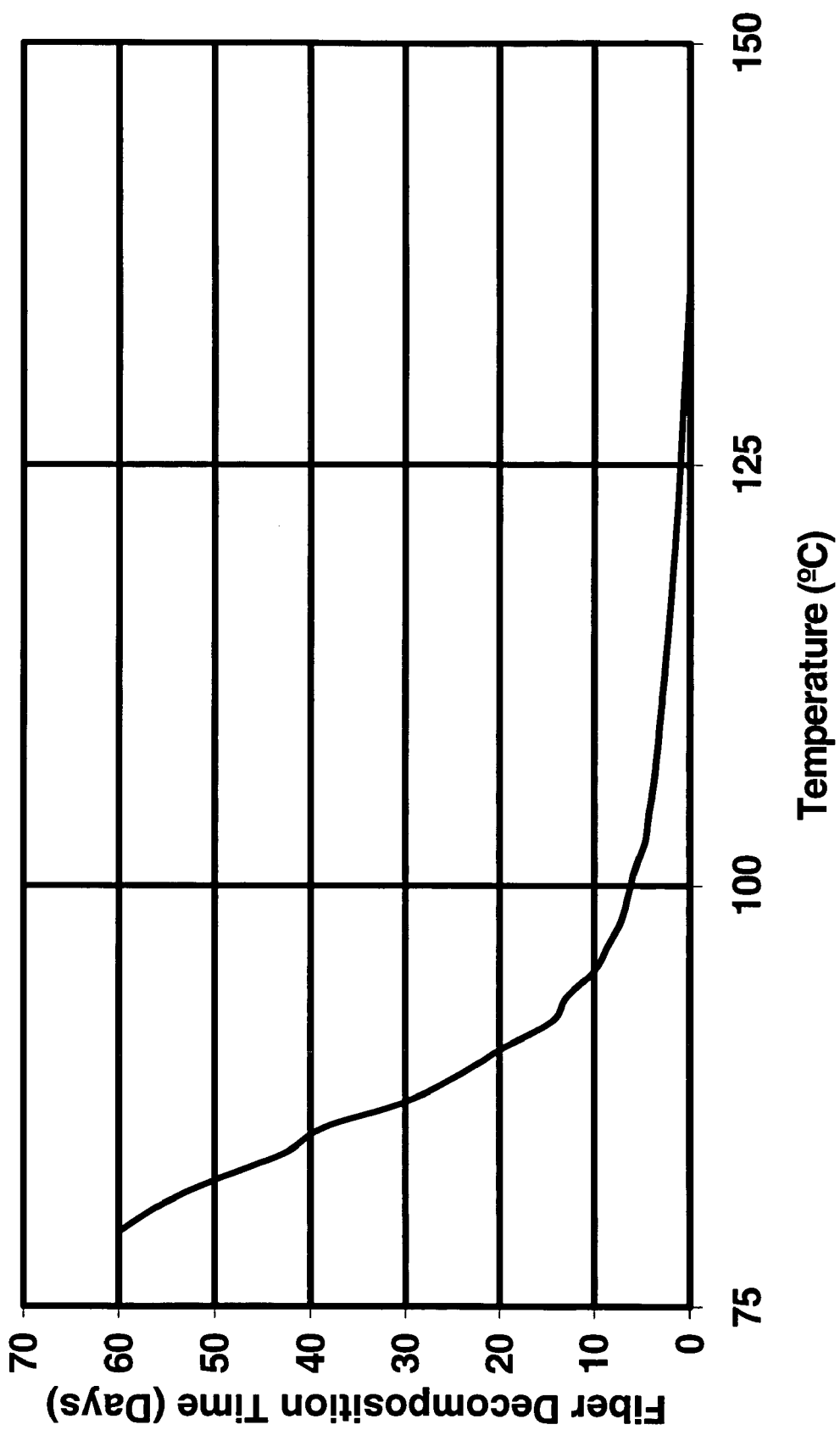
FIG. 1 shows the rate of decomposition of a fiber used in the invention as a function of temperature.
Figure 2:
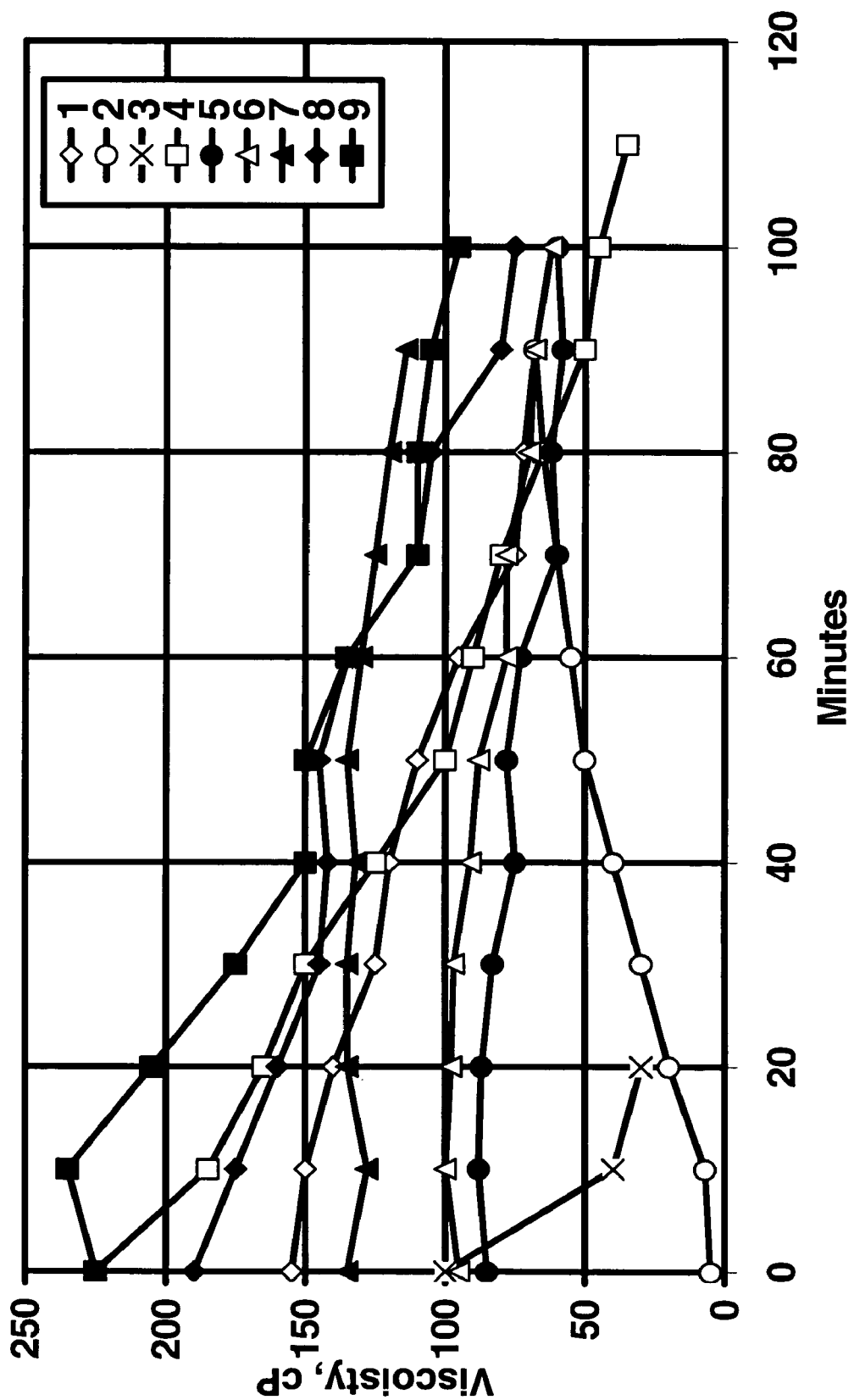
FIG. 2 presents the viscosities of a number of fluids, some suitable for the invention and some not, as a function of time at several temperatures.

We have found that suitable fibers can assist in transporting, suspending and placing proppant in hydraulic fracturing and gravel packing and then degrade to minimize or eliminate the presence of fibers in the proppant pack without releasing degradation products that either a) react with certain multivalent ions present in the fracture water or gravel packing carrier fluid, or formation water to produce materials that hinder fluid flow, or b) decrease the ability of otherwise suitable metal-crosslinked polymers to viscosify the carrier fluid. We will refer to a system in which suitable fibers and a fluid viscosified with a suitable metal-crosslinked polymer system are used to slurry and transport proppant as a "fiber/polymeric viscosifier" system or an "FPV" system.

The FPV system will be described primarily in terms of hydraulic fracturing, but it is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures, that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore. Gravel is also a natural or synthetic material, which may be identical to, or different from, proppant. Gravel packing is used for "sand" control. Sand is the name given to any particulate material, such as clays, from the formation that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed; they may also be damaged, so that fracturing is also needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

The FPV system is particularly suitable for fracturing tight gas wells, which are typically low-permeability environments with extended fracture closure times; in such cases the fracture may remain open for hours after injection ceases, and the carrier fluid may break and no longer suspend the proppant. The FPV system allows lower polymer loadings, reduced fracture height growth (because of the lower viscosity that can be used), reduced proppant settling, and increased retained permeability (improved dimensionless fracture conductivity), all of which result in improved production rates. The FPV system is also particularly suitable for gravel packing when dense brines are used that contain high concentrations of calcium or other ions that would precipitate with the degradation products of other degradable fibers (for example up to 12,000 ppm calcium). It is also particularly suitable for situations in which the connate water, that will flow into the fracture after the treatment, is high in such ions as calcium and magnesium.

Some fibers previously used for transporting, suspending, and placing proppant, such as polyethylene terephthalate, degrade into by-products that may precipitate salts in the presence of excessive amounts of calcium or magnesium in the connate water. Preventive measures may be taken with other fibers, such as, but not limited to, pumping a pre-pad and/or pumping an acid or a chelating dissolver, adsorbing or absorbing an appropriate chelating agent onto or into the fiber, or incorporating in the fluid precipitation inhibitors or metal scavenger ions that prevent precipitation. With the fibers of the FPV system screening for these cations in the connate water and applying these preventive or correction measures are not necessary.

Early treatments using fibers to help transport proppant, sometimes called "fiber assisted transport" treatments were typically slickwater (also called waterfrac) treatments (with minimal proppant and a fluid viscosity, for example, of only about 3 cP), as opposed to conventional treatments with crosslinked polymer carrier fluids that typically have viscosities of at least 100 cP, and usually much more. It has now been found that the treatments with fibers in the fluid are improved if low-concentration crosslinked polymer carrier fluids are used, for example having a viscosity of at least about 50 cP, preferably at least about 75 cP, (at 100 sec$^{-1}$) at the temperature at which the fluid is used, especially in stiffer rocks commonly found in tight gas reservoirs, in which the higher viscosity provides increased fracture width. The FPV system de-couples proppant transport characteristics of the fluid from the fluid viscosity. It allows a much lower polymer loading to be used to achieve proppant placement without sacrificing proppant coverage; this means less chance of undesired fracture height growth and reduced fracture damage due to polymer or crosslinked polymer. The viscosity needed depends upon factors such as the stiffness of the rock; the amount, identity, size and stiffness of the fibers; the pumping rate and duration; and only to some extent the proppant size, concentration and density. The viscosity needed can be determined by mathematical modeling or by experiments, such as those known as slot flow experiments, known in the industry. Oilfield service companies and contract testing companies can make such determinations.

Suitable materials for the fibers of the invention include substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, or mixtures of the preceding. Other materials suitable for use are all those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355, all three hereby incorporated by reference. Suitable materials for the fibers of the invention are also described in U.S. Patent Application Publication Nos. 2003/002195 and 2004/0152601, both of which are hereby incorporated by reference and are assigned to the assignee of the present application. Other polymers, for example those that degrade at other temperatures, or other pH's, or those that have different chemical compatibilities, may be used, for example polyvinyl alcohol, optionally with suitable carrier fluid adjustment.

Excellent materials for the fibers of the invention are solid cyclic dimers, or solid polymers, of certain organic acids, that hydrolyze under known and controllable conditions of temperature, time and pH; the degradation products are organic acids. One example of a suitable material is the solid cyclic dimer of lactic acid (known as "lactide"), which has a melting point of 95 to 125° C., (depending upon the optical activity). Another is a polymer of lactic acid, (sometimes called a polylactic acid (or "PLA"), or a polylactate, or a polylactide). Another example is the solid cyclic dimer of gylycolic acid (known as "glycolide"), which has a melting point of about 86° C. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters. Generally the cyclic dimmers are polymerized to form the final polymer from which the fiber is made, but for low temperature operations fiber may be made directly from the solid cyclic dimmers. The as-received commercially available materials may contain some free acid, for example up to about 5%) and some solvent, typically water.

NatureWorks LLC, Minnetonka, Minn., USA, owned by Cargill Inc., Minneapolis, Minn., USA, produces the solid cyclic lactic acid dimer called "lactide" and from it produces lactic acid polymers, or polylactates, with varying molecular weights and degrees of crystallinity, under the generic trade name NatureWorks™ PLA. The PLA's currently available from NatureWorks most commonly have molecular weights of up to about 100,000, although any polylactide (made by any process by any manufacturer) and any molecular weight material of any degree of crystallinity may be used in the embodiments of the Invention. The PLA polymers are solids at room temperature and are hydrolyzed by water to form lactic acid. Those available from NatureWorks typically have crystalline melt temperatures of from about 120 to about 170° C., but others are obtainable. Poly(d,1-lactide) is available from Bio-Invigor, Beijing and Taiwan, with molecular weights of up to 500,000. Bio-Invigor also supplies polyglycolic acid (also known as polyglycolide) and various copolymers of lactic acid and glycolic acid, often called "polyglactin" or poly(lactide-co-glycolide). The rates of the hydrolysis reactions of all these materials are governed, among other factors, by the molecular weight, the crystallinity (the ratio of crystalline to amorphous material), the physical form (size and shape of the solid), and in the case of polylactide, the amounts of the two optical isomers. (The naturally occurring 1-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

Homopolymers can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the fibers dissolve very slowly in water before they hydrolyze The fibers of the invention may be coated to slow the hydrolysis. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the materials for the fibers of the invention by any means delays the hydrolysis. Note that coating here may refer to encapsulation or simply to changing the surface by chemical reaction or by forming or adding a thin film of another material, for example an oil. The degradation does not occur until water contacts the materials the fibers.

The fibers self-destruct in situ, that is, in the location where they are placed. Although normally that is in a proppant pack in a fracture, that location may also be part of a suspension in the wellbore, in perforations, in a gravel pack, as a component of a filter cake on the walls of a wellbore or of a fracture, or in natural fractures or vugs in a formation. The fiber/polymeric viscosifier system may be used in carbonates and sandstones. A particular advantage of these materials is that the fibers of the invention and the generated acids are non-toxic and are biodegradable.

Suitable fibers have a length of about 2-25 mm, preferably about 3-18 mm, most preferably about 6 mm; they have a denier of about 0.1-20, preferably about 0.15-6, most preferably about 1.4 Such fibers are optimized for particle transport.

Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of effective water-soluble polymers (provided that specific examples chosen are compatible with the fibers of the invention) include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinly acetate, polyalkyleneoxides, carboxycelluloses, carboxyalkylhydroxyethyl celluloses, hydroxyethylcellulose, other galactomannans, heteropolysaccharides obtained by the fermentation of starch-derived sugar (e.g., xanthan gum), and ammonium and alkali metal salts thereof.

Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent proppant-suspension ability even though they are more expensive than guar derivatives and therefore have been used less frequently unless they can be used at lower concentrations.

Linear (not cross-linked) polymer systems may be used, but generally will not be preferred because they will require more polymer. All crosslinked polymer systems may be used, including for example delayed, optimized for high temperature, optimized for use with sea water, buffered at various pH's, and optimized for low temperature. Any crosslinker may be used, for example boron, titanium, and zirconium. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include by non-limiting example, those crosslinked by zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid. Any other chemical additives can be used or included provided that they are tested for compatibility with the fibers and fiber degradation products of the invention (neither the fibers or their degradation products or the chemicals in the fluids interfere with the efficacy of one another or with fluids that might be encountered during the job, like connate water or flushes). For example, some of the standard crosslinkers or polymers as concentrates usually contain materials such as isopropanol, n-propanol, methanol or diesel oil.

Because the fibers degrade to release acid, two metal crosslinked polymer systems are particularly preferred. These preferred fluids are relatively insensitive to the release of acid that accompanies the degradation of the fibers. (Other fluids may be used, especially under mild conditions or for short treatments, but may be less stable.) The preferred borate crosslinked fluids initially have high a pH, for example above about 11.5. Degradation of 3.6 g/L (30 ppt) of fibers will decrease the pH to about 9 to 9.5. At that pH borate fluids are still crosslinked. If the pH drops below about 9, however, the fluid starts to break. Conversely, the rate of degradation of PLA is lowest at about a pH of 5; it increases at lower and higher pH's, increasing faster at higher pH's than at low. The fiber described in Example 1 below has an expected downhole life of about 5 to 6 hours at a pH of 6 to 7 at 121° C. 250° F.; about 3 to 4 hours at a pH of about 10 at that temperature; and about 2 to 3 hours at a pH of about 12 at that temperature. At a pH of about 12, the fiber has an expected downhole life of about 5 to 6 hours at 104° C. 220° F. and of about 15 to 18 hours at about 93° C. 200° F. Preferably, the fibers degrade in a time at formation temperature of from about 4 hours to about 100 days. Triethanolamine stabilizes the fluids to the acid released from the fibers up to a concentration of about 2 gpt of an 85% triethanolamine solution in water. Another reason why these fluids are preferred is that it is better to use delayed fluids with fibers, because fiber dispersion in water is better before crosslinking.

The first preferred metal-crosslinked polymer system is a boron crosslinked guar designed for delayed crosslinking and optimized for low guar concentrations. It is made for example with a guar or guar slurry, boric acid, solid or concentrated sodium hydroxide, and sorbitol as a stabilizer/delay agent; it may contain clay stabilizers such as potassium chloride or tetramethylammonium chloride, additional stabilizers such as sodium thiosulfate (usually obtained as the pentahydrate) and triethanolamine, bactericides, breakers, and breaker aids. A particularly preferred example of this fluid, used for example at temperatures below about 110° C. (about 230° F.) is made with about 2.16 g/L (18 ppt or pounds per thousand gallons) guar; 2 L/1000 L (2 gpt) of a 50% tetra methyl ammonium chloride solution in water; 1 L/U1000 L (1 gpt) of a non-emulsifying agent containing about 30 to 50% of a blend of alkoxylated polyols, resins, and hydrocarbon solvents in methanol, propan-2-ol and xylene; 2 L/1000 L (2 gpt) of a surfactant containing a mixture of about 15% ethoxylated $Cu_{11}$ to $C_{15}$ linear and branched alcohols in water, isopropanol and ethylene glycol monobutyl ether; 0.74 g/L (6.21 ppt) boric acid; 1.74 g/L (14.52 ppt) caustic soda; 2 L/1000 L (2 gpt) of an 85% triethanolamine solution in water; and 2 L/1000 L (2 gpt) of a 48% d-sorbitol (delay agent) solution in water. The fluid may optionally also contain a breaker such as, but not limited to, ammonium persulfate or sodium bromate. This formulation is for example used at a guar concentration of about 1.92 g/L (about 16 ppt) to about 3.6 g/L (about 30 ppt) with the amounts of additives listed above; preferably for example at concentrations up to about 2.88 g/L (about 24 ppt) with 1 to 2 L/1000 L (1 to 2 gpt) of the 50% tetra methyl ammonium chloride solution in water; 0-1 L/1000 L (0-1 gpt) of the surfactant described above; 1-2 L/1000 L (1-2 gpt) of the non-emulsifying agent described above; 0.74 g/L (6.21 ppt) boric acid; 1.74 g/L (14.52 ppt) caustic soda; 0-2

L/1000 L (0-2 gpt) of an 85% triethanolamine solution in water; and 1-3 L/1000 L (1-3 gpt) of a 48% d-sorbitol solution in water.

The second preferred metal crosslinked polymer system is a zirconium crosslinked carboxymethylhydroxypropyl guar (CMHPG) that is particularly suitable for example at temperatures between about 79° C. (about 175° F.) to about 121° C. (about 250° F.), in particular above about 110° C. (about 230° F.). This fluid is made for example with about 2.64 g/L (about 22 ppt) carboxymethylhydroxypropyl guar and about 20 g/L (167 ppt) KCl; 4 L/1000 L (4 gpt) of a 30% sodium thiosulfate solution in water (gel stabilizer); 0.1 L/1000 L (0.1 gpt) of a 75% acetic acid and 14% propan-2-ol solution in water; and 0.52 L/1000 L (0.52 gpt) of 23% zirconium lactate (crosslinker) solution in a methanol (14%)-water solution. This formulation is for example used at a carboxymethylhydroxypropyl guar concentration of about 2.64 g/L (about 22 ppt) to about 3.6 g/L (about 30 ppt) with for example about 20 to 50 g/L (about 167-417 ppt) KCl; about 2-7 L/1000 L (2-7 gpt) of a 30% sodium thiosulfate solution in water; about 0.1 to 0.12 L/1000 L (0.1 to 0.12 gpt) of a 75% acetic acid and 14% propan-2-ol solution in water; and 0.45 to 0.65 L/1000 L (0.45 to 0.65 gpt) of 23% zirconium lactate solution in a methanol (14%)-water solution; preferably at about 3.00 g/L (about 25 ppt) with 20 g/L (167 ppt) KCl; 4 L/1000 L (4 gpt) of a 30% sodium thiosulfate solution in water; 0.12 L/1000 L (0.12 gpt) of a 75% acetic acid and 14% propan-2-ol solution in water; and 0.52 L/1000 L (0.52 gpt) of 23% zirconium lactate solution in a methanol (14%)-water solution.

The preferred concentration of fiber is 2.40 g/L (20 ppt) for proppant loadings of (0.12 to 0.36 kg/L) (1 to 3 PPA); 3.59 g/L (30 ppt) for proppant loadings of 0.36 to 0.6 kg/L (3 to 5 PPA); and 4.80 g/L (40 ppt) for proppant loadings of over 0.6 kg/L (5 PPA). Fiber concentrations are generally ramped based on proppant concentrations. The preferred polymer crosslinked fluid (for example those described immediately above) is shown in Table 1 below:

TABLE 1

| Temperature (° C.) | Fiber Concentration g/L | | |
|---|---|---|---|
| | 2.40 | 3.59 | 7.19 |
| | Gel Concentration g/L | | |
| <93 | 2.16 guar | 2.16 guar | 2.16 guar |
| 104 | 2.16 guar | 2.16 guar | 2.64 guar |
| 110 | 2.64 guar | 2.88 guar | 2.88 guar |
| 115.5 | 2.64 CMHPG | 2.64 CMHPG | 2.64 CMHPG |
| 121 | 3.00 CMHPG | 3.00 CMHPG | 3.00 CMHPG |

With these proppant, polymer, and fiber concentrations, the fluid stability is high enough and the proppant settling is slow enough to provide excellent fracture conductivity.

As with metal cross-linked polymer systems, any viscoelastic surfactant fluid systems (such as cationic, amphoteric, anionic, nonionic, mixed, and zwitterionic viscoelastic surfactant fluid systems, especially betaine zwitterionic viscoelastic surfactant fluid systems or amidoamine oxide surfactant fluid systems) may be also used provided that they are tested for compatibility with the fibers and fiber degradation products of the invention (neither the fibers or their degradation products or the chemicals in the fluids interfere with the efficacy of one another or with fluids that might be encountered during the job, like connate water or flushes). Non-limiting suitable examples include those described in U.S. Pat. Nos. 5,551,516; 5,964,295; 5,979,555; 5,979,557; 6,140,277; 6,258,859 and 6,509,301, all hereby incorporated by reference.

As has been mentioned, the fiber degradation products are natural breakers for viscosifiers, especially for boron-crosslinked polymers and for VES systems, although this is not a major factor because of the low polymer loadings and because VES systems break inherently easily.

Any proppant (gravel) can be used, provided that it is compatible with the fibers, the formation, the fluid, and the desired results of the treatment. Such proppants (gravels) can be natural or synthetic (including but not limited to glass beads, ceramic beads, sand, and bauxite), coated, or contain chemicals; more than one can be used sequentially or in mixtures of different sizes or different materials. The proppant may be resin coated, preferably pre-cured resin coated, provided that the resin and any other chemicals that might be released from the coating or come in contact with the other chemicals of the Invention are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, preferably about 0.12 to about 0.72 kg/L (about 1 PPA to about 8 PPA, for example from about 0.12 to about 0.54 kg/L 1 to about 6 PPA). (PPA is "pounds proppant added" per gallon of liquid.)

Most commonly the fiber is mixed with a slurry of proppant in crosslinked polymer fluid in the same way and with the same equipment as is used for fibers used for sand control and for prevention of proppant flowback, for example, but not limited to, the method described in U.S. Pat. No. 5,667,012. In fracturing, for proppant transport, suspension, and placement, the fibers are normally used with proppant or gravel laden fluids, not normally with pads, flushes or the like.

Also optionally, the fracturing fluid can contain materials designed to limit proppant flowback after the fracturing operation is complete by forming a porous pack in the fracture zone. Such materials can be any known in the art, such as other fibers, such as glass fibers, available from Schlumberger under the trade name PropNET™ (for example see U.S. Pat. No. 5,501,275). Exemplary proppant flowback inhibitors include fibers or platelets of novoloid or novoloid-type polymers (U.S. Pat. No. 5,782,300). Thus the FPV system may contain a second fiber, for example non-degradable or degradable only at a higher temperature, present primarily to aid in preventing proppant flowback. The FPV system may also contain another fiber, such as a polyethylene terephthalate fiber, that is also optimized for assisting in transporting, suspending and placing proppant, but has a higher degradation temperature and would precipitate calcium and magnesium without preventive measures being taken. As has been mentioned, appropriate preventive measures may be taken with other fibers, such as, but not limited to, pumping a pre-pad and/or pumping an acid or a chelating dissolver, adsorbing or absorbing an appropriate chelating agent onto or into the fiber, or incorporating in the fluid precipitation inhibitors or metal scavenger ions that prevent precipitation.

Although the invention has been described to this point with the use of metal crosslinked polymer fluids, viscoelastic surfactant based carrier fluids may also be used with fibers designed to transport, suspend and place proppant. As with polymers, advantages are that lower viscosities, and thus less chemical can be used, and that the fiber degradation product is a breaker. Viscoelastic surfactant based fluid systems are inherently non-damaging.

Any additives normally used in such treatments may be included, again provided that they are compatible with the other components and the desired results of the treatment. Such additives can include, but are not limited to antioxidants, crosslinkers, corrosion inhibitors, delay agents, biocides, buffers, fluid loss additives, etc. The wellbores treated can be vertical, deviated or horizontal. They can be completed with casing and perforations or open hole.

Other forms of fluids sometimes used as carrier fluids or fracturing fluids may also be used in conjunction with the FPV system. For example, the carrier fluid may be an emulsion or may be foamed or energized.

The present invention can be further understood from the following examples.

EXAMPLE 1

FIG. 1 shows the decomposition rate of a suitable fiber of the invention, a polylactic acid containing about 87 weight % polylactide, about 12 weight % water, and about 1 weight % sizing. The material was NatureWorks™ PLA 6201D or NatureWorks™ PLA 6202D, made into a fiber of average length about 5.7 to 6.3 mm, and denier about 1.35 to about 1.45. It has been found that the degradation rate is about the same for 6201D and 6202D. It can be seen that the fiber decomposes in about 1 day at 121° C. (about 250° F.) and at about 2 months at 79.4° C. (about 175° F.).

EXAMPLE 2

The viscosities of a number of polymer-based fluids were determined at various temperatures as a function of time at temperature in a Fann 50 viscometer. Each fluid contained 3.60 g/L (30 ppt) of the same fibers as used in Example 1. Fluids were made in a Waring blender; in each case, the fluid was made by adding slurried polymer to water, hydrating the polymer, then adding other additives, then adding fiber to the linear gel before the crosslinking step, and then adding crosslinker. Those skilled in the art know how to make metal crosslinked polymer fluids in the laboratory and in the field, and they know the variations that can be made (for example pre-mixing certain components, or using batch mixing or continuous mixing methods) to the following general procedure. Specific fluids should be tested in a manner similar to this before use. The runs with fluids 1-7 were done at 93° C. (200° F.); fluid 8 was the same fluid as fluid 7 but the run was done at 107° C. (225° F.); fluid 9 was the same fluid as fluid 7 but the run was done at 121° C. (250° F.). The times shown were the times after the fluids reached the intended temperature. The fluids were as follows:

Fluid 1: (A preferred 2.16 g/L (18 ppt) borate crosslinked guar of the invention.) The fluid contained 2.16 g/L of guar; 2 L/1000 L of a 50% tetra methyl ammonium chloride solution in water; 1 L/1000 L of the non-emulsifying agent described previously; 2 L/1000 L of the surfactant containing a mixture of about 15% ethoxylated $C_{11}$ to $C_{15}$ linear and branched alcohols in water, isopropanol and ethylene glycol monobutyl ether; 1.13 g/L (9.4 ppt) d-sorbitol; 1.6 L/1000 L of 30% sodium hydroxide solution in water; and 0.55 g/L (4.6 ppt) boric acid.

Fluid 2: (An unsuitable 2.16 g/L (18 ppt) borate crosslinked guar fluid.) The fluid contained 2.16 g/L (18 ppt) guar polymer; 2 wt % KCl or 2 L/1000 L tetramethyl ammonium chloride; 2 L/1000 L of the surfactant containing a mixture of about 15% ethoxylated $C_{11}$ to $C_{15}$ linear and branched alcohols in water, isopropanol and ethylene glycol monobutyl ether; 1.3 L/1000 L sodium tetraborate (borate crosslinker) in a hydrocarbon slurry; 4 L/1000 L sodium thiosulfate; 4 L/1000 L of 85% triethanolamine solution in water; 2 L/1000 L of a 30 wt % solution of NaOH in water; and 2 L/1000 L of 0.06 kg/L boric acid in water.

Fluid 3: (An unsuitable 3.6 g/L (30 ppt) borate crosslinked guar fluid.) The fluid contained 3.6 g/L (30 ppt) guar polymer; 2 wt % KCl or 2 L/1000 L tetramethyl ammonium chloride; 2 L/1000 L of the surfactant containing a mixture of about 15% ethoxylated $C_{11}$ to $C_{15}$ linear and branched alcohols in water, isopropanol and ethylene glycol monobutyl ether; and 3.5 l/1000 L of a crosslinker containing about 10 to 20% sodium tetraborate decahydrate in a mixture of glycerol and water.

Fluid 4: (A suitable 2.64 g/L (22 ppt) borate crosslinked guar of the invention.) The fluid contained 2.64 g/L (22 ppt) guar polymer; 2 wt % KCl or 2 L/1000 L tetramethyl ammonium chloride; 2 L/1000 L of the surfactant containing a mixture of about 15% ethoxylated $C_{11}$ to $C_{15}$ linear and branched alcohols in water, isopropanol and ethylene glycol monobutyl ether; 2.1 L/1000 L (2.1 gpt) of a crosslinker containing about 10 to 20% sodium tetraborate decahydrate in a mixture of glycerol and water; and 0.4 L/1000 L (0.4 gpt) of a 30 wt % solution of NaOH.

Fluid 5: (A preferred 2.16 g/L (18 ppt) zirconate crosslinked CMHPG fluid of the invention.) The fluid contained 2.16 g/L of CMHPG; 20 g/L of potassium chloride; 0.1 l/1000 L (0.1 gpt) of a 75% acetic acid and 14% propan-2-ol solution in water; 2 L/1000 L (2 gpt) of a 30% sodium thiosulfate solution in water; and 0.52 L/1000 L (0.52 gpt) of 23% zirconium lactate solution in a methanol (14%)-water solution Fluid 6: (A preferred 2.4 g/L (20 ppt) zirconate crosslinked CMHPG fluid of the invention.) The fluid contained 2.4 g/L of CMHPG; 20 g/L of potassium chloride; 0.1 L/1000 L (0.1 gpt) of a 75% acetic acid and 14% propan-2-ol solution in water; 2 L/1000 L of a 30% sodium thiosulfate solution in water; and 0.52 L/1000 L (0.52 gpt) of 23% zirconium lactate solution in a methanol (14%)-water solution Fluids 7-9: (A preferred 2.64 g/L (22 ppt) zirconate crosslinked CMHPG fluid of the invention.) The fluid contained 2.64 g/L of CMHPG; 20 g/L of potassium chloride; 0.1 L/1000 L (0.1 gpt) of a 75% acetic acid and 14% propan-2-ol solution in water; 2 L/1000 L (2 gpt) of a 30% sodium thiosulfate solution in water; and 0.52 L/1000 L (0.52 gpt) of 23% zirconium lactate solution in a methanol (14%)-water solution The data show the difference between unsuitable, suitable, and preferred fluids. Unsuitable fluids cannot achieve or cannot maintain adequate viscosity. Suitable fluids achieve useful viscosity for a useful period by starting with high viscosity. The preferred fluids lose viscosity only very slowly and so do not require high initial viscosities; in fact breakers might be advantageous with such fluids. Those skilled in the art know of suitable breakers (such as but not limited to enzymes or oxidative breakers) and how to use them.

Although the methods and compositions of the invention have been described primarily in terms of stimulation of hydrocarbon producing wells, it is to be understood that the invention may be applied to wells for the production of other materials such as water, helium and carbon dioxide and that the invention may also be applied to stimulation of other types of wells such as injection wells, disposal wells, and storage wells.

The invention may be applied to any type of well, for example cased or open hole; drilled with an oil-based mud or a water-based mud; vertical, deviated or horizontal; with or without sand control, such as with a sand control screen. Other treatments may be performed before or after the treatment of the invention, for example scale inhibition, matrix treatment, killing, lost circulation control, injection of spacers, pushers, pre-flushes, post-flushes, etc. The treatment of the invention may be through coiled tubing. In other words, the chemistry, configuration, tools, etc. used in drilling and completion and other treatments before or after the application of the invention are not critical, provided that any fluids used or encountered do not interfere with the fluids and materials used in the invention; this may be checked readily by simple laboratory or simulation experiments in which the potential interactions are tested under expected conditions to ensure that there are no deleterious effects.

What is claimed is:

1. A method of treating a wellbore and a formation penetrated by the wellbore comprising a step of injecting a slurry of fibers and proppant in a viscous carrier fluid, wherein the viscosity of the carrier fluid in the absence of fibers is insufficient to prevent proppant settling during transport, wherein the fibers degrade after the treatment into products that do not precipitate in the presence of calcium or magnesium ions, and wherein the fiber comprises polylactic acid.

2. The method of claim 1 wherein the step of injecting is carried out above the fracture pressure of the formation.

3. The method of claim 2 further wherein the viscosity of the carrier fluid in the absence of fibers is insufficient to prevent proppant settling in the fracture before closure of the fracture after injection is stopped.

4. The method of claim 1 wherein the fibers have a length of about 2 to about 25 mm.

5. The method of claim 4 wherein the fibers have a length of about 3 to about 18 mm.

6. The method of claim 1 wherein the fibers have a denier of about 0.1 to about 20.

7. The method of claim 6 wherein the fibers have a denier of about 0.15 to about 6.

8. The method of claim 1 wherein the fibers degrade at formation temperature in a time between about 4 hours and 100 days.

9. The method of claim 1 wherein the carrier fluid comprises a borate crosslinked polymer.

10. The method of claim 9 wherein the polymer comprises guar.

11. The method of claim 10 wherein the polymer concentration is between about 1.92 g/L (about 16 ppt) and about 3.6 g/L (about 30 ppt).

12. The method of claim 11 wherein the polymer concentration is between about 1.92 g/L (about 16 ppt) and about 2.88 g/L (about 24 ppt).

13. The method of claim 9 wherein the carrier fluid comprises a pH control agent present in an amount sufficient to neutralize any acid present in the fibers before the injection and to neutralize any acid generated by the fibers before the fracture closes.

14. The method of claim 13 wherein acid is neutralized to an extent sufficient to maintain the viscosity of the fluid in the presence of fibers above about 75 cP at a shear rate of 100 sec$^{-1}$ at the temperature of the formation.

15. The method of claim 13 wherein the pH control agent is selected from the group consisting of amines and alkaline earth, ammonium and alkali metal salts of sesquicarbonates, carbonates, oxalates, hydroxides, oxides, bicarbonates, and organic carboxylates.

16. The method of claim 15 wherein the pH control agent is selected from sodium sesquicarbonate, triethanolamine and tetraethylenepentamme.

17. The method of claim 9 wherein the borate crosslinker is selected from boric acid and sodium tetraborate decahydrate.

18. The method of claim 9 wherein the fluid further comprises a crosslinking delay agent.

19. The method of claim 18 wherein the crosslinking delay agent comprises sorbitol.

20. The method of claim 1 wherein the carrier fluid comprises a polymer crosslinked with a zirconate.

21. The method of claim 20 wherein the polymer comprises carboxymethylhydroxypropyl guar.

22. The method of claim 20 wherein the polymer concentration is between about 2.64 g/L (about 22 ppt) to about 3.6 g/L (about 30 ppt).

23. The method of claim 20 wherein the zirconate crosslinker comprises zirconium lactate.

24. The method of claim 20 wherein the fluid further comprises a gel stabilizer.

25. The method of claim 24 wherein the gel stabilizer comprises sodium thiosulfate.

26. The method of claim 1 wherein the fluid further comprises a breaker.

27. The method of claim 1 wherein the carrier fluid comprises an emulsion.

28. The method of claim 27 wherein the viscoelastic surfactant is selected from the group consisting of a betaine and an amidoamine oxide.

29. The method of claim 1 wherein the carrier fluid comprises a foam or an energized fluid.

30. The method of claim 1 wherein the carrier fluid comprises a solution of diutan, xanthan, scleroglucan, or hydroxyethylcellulose.

31. The method of claim 1 wherein the carrier fluid comprises a viscoelastic surfactant.

* * * * *